United States Patent
Dingli et al.

(10) Patent No.: US 12,311,942 B2
(45) Date of Patent: May 27, 2025

(54) VEHICLE CONTROL IN RESCUE LANE SCENARIOS

(71) Applicant: PlusAI, Inc., Santa Clara, CA (US)

(72) Inventors: Robert Joseph Dingli, Cupertino, CA (US); Joseph Michael Martin, Munich (DE)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/527,940

(22) Filed: Dec. 4, 2023

(65) Prior Publication Data

US 2024/0262357 A1 Aug. 8, 2024

Related U.S. Application Data

(63) Continuation of application No. 18/107,416, filed on Feb. 8, 2023, now Pat. No. 11,866,041.

(51) Int. Cl.
*B60W 30/16* (2020.01)
*B60W 30/12* (2020.01)
*B60W 50/14* (2020.01)
*B60W 60/00* (2020.01)

(52) U.S. Cl.
CPC ............ *B60W 30/16* (2013.01); *B60W 30/12* (2013.01); *B60W 50/14* (2013.01); *B60W 60/0015* (2020.02); *B60W 60/0053* (2020.02); *B60W 2552/53* (2020.02); *B60W 2554/404* (2020.02); *B60W 2554/408* (2020.02)

(58) Field of Classification Search
CPC ...... B60W 30/16; B60W 30/12; B60W 50/14; B60W 60/0015; B60W 60/0053; B60W 2552/53; B60W 2554/404; B60W 2554/408; B60W 30/143
See application file for complete search history.

(56) References Cited

U.S. PATENT DOCUMENTS

| 10,474,164 | B2 * | 11/2019 | Wheeler | G05D 1/0276 |
| 2017/0364069 | A1 | 12/2017 | Colella et al. | |
| 2018/0293886 | A1 | 10/2018 | Frederick et al. | |
| 2019/0113926 | A1 * | 4/2019 | Sim | G05D 1/0088 |

(Continued)

FOREIGN PATENT DOCUMENTS

| DE | 202019005277 U1 * | 8/2020 | G08G 1/0962 |
| GB | 2578915 A | 6/2020 | |

(Continued)

OTHER PUBLICATIONS

"Rettungsgasse Infovideo—So funktioniert die Rettungsgasse" httos://youtu.be/BdT_QY307fw showing the required behavior in Germany in crowded traffic to create an emergency corridor (0:12-0:36 relevant section) (Year: 2013).*

(Continued)

*Primary Examiner* — Kito R Robinson
*Assistant Examiner* — Tanya C Sienko
(74) *Attorney, Agent, or Firm* — Sheppard Mullin Richter & Hampton LLP

(57) ABSTRACT

Methods, systems, and non-transitory computer-readable media are configured to perform operations comprising determining a rescue lane scenario for an environment, determining an amount of lateral bias for a vehicle, and generating planning and control data for the vehicle to laterally bias based on the amount of lateral bias.

20 Claims, 10 Drawing Sheets

(56) References Cited

U.S. PATENT DOCUMENTS

| | | | |
|---|---|---|---|
| 2020/0094826 A1* | 3/2020 | Abe | B60W 60/0053 |
| 2020/0369293 A1 | 11/2020 | Jeon et al. | |
| 2021/0001888 A1* | 1/2021 | Oguro | B60W 30/12 |
| 2022/0063495 A1* | 3/2022 | Hawley | B60Q 9/008 |
| 2022/0169285 A1 | 6/2022 | Griffin et al. | |
| 2022/0363261 A1 | 11/2022 | Buck et al. | |

FOREIGN PATENT DOCUMENTS

| | | | |
|---|---|---|---|
| GB | 2578916 A | 6/2020 | |
| GB | 2579022 A | 6/2020 | |
| WO | 2020244841 A1 | 12/2020 | |
| WO | WO-2021239531 A1 * | 12/2021 | B62D 15/025 |

OTHER PUBLICATIONS

Machine translation of DE 202019005277 downloaded from Espacenet (Year: 2023).*

Machine translation from IP.com downloaded Dec. 16, 2024 (Year: 2024).*

"Lane Centering" from Wikipedia, The Wayback Machine, <URL: https://web.archive.org/web/20220201233639/https://en.wikipedia.org/wiki/Lane_centering>, Feb. 1, 2022 (Year: 2022), 15 pages.

Machine translation of DE 20 2019 005 277 U1, downloaded from Espacenet (Year: 2023), 4 pages.

"MyCarDoesWhat.org—Deeper Learning: Adaptive Cruise Control", University of Iowa College of Education, The Wayback Machine, <URL: https://mycardoeswhat.org/wp-content/uploads/2015/10/MCDW-Deeper-Learning-ACC.pdf>, Sep. 24, 2021 (Year: 2021), 6 pages.

"For Everyone's Safety—Move Over for Emergency Vehicles", published in Prince William Living, <URL: https://princewilliamliving.com/for-everyones-safety-move-over-for-emergency-vehicles/>, Mar. 3, 2022 (Year: 2022), 6 pages.

"Rettungsgasse Infovideo—So funktioniert die Rettungsgasse", <URL: https://www.youtube/BdT_QY307fw>, showing the required behavior in Germany in crowded traffic to create an emergency corridor (0: 12-0:36 relevant section) (Year: 2013), 2 pages.

* cited by examiner

VEHICLE CONTROL IN RESCUE LANE SCENARIOS

CROSS-REFERENCE TO RELATED APPLICATIONS

This application is a continuation of U.S. patent application Ser. No. 18/107,416, filed on Feb. 8, 2023 and entitled "VEHICLE CONTROL IN RESCUE LANE SCENARIOS", which is incorporated in its entirety herein by reference.

FIELD OF THE INVENTION

The present technology relates to autonomous systems. More particularly, the present technology relates to autonomous vehicle control in various scenarios.

BACKGROUND

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change.

SUMMARY

Various embodiments of the present technology can include methods, systems, and non-transitory computer readable media configured to perform operations comprising determining a rescue lane scenario for an environment, determining an amount of lateral bias for a vehicle, and generating planning and control data for the vehicle to laterally bias based on the amount of lateral bias.

In some embodiments, the operations further comprise generating an alert that indicates the rescue lane scenario, and providing an option through the alert to engage manual control of the vehicle.

In some embodiments, the operations further comprise generating planning and control data for the vehicle to maintain speed based on a speed of a leading vehicle in front of the vehicle.

In some embodiments, the amount of lateral bias is based on at least one of: an available drivable road surface, a lane marking of a lane, a roadside infrastructure, and an average amount of lateral bias of other vehicles in a lane of the vehicle.

In some embodiments, the operations further comprise determining an end of the rescue lane scenario; and generating planning and control data for the vehicle to center in a middle of a lane.

In some embodiments, the end of the rescue lane scenario is determined based on satisfaction of rescue lane end conditions, wherein the rescue lane end conditions include at least one of: a condition related to increased traffic speed in a lane of the vehicle, a condition related to increased traffic speed in a lane adjacent to the lane of the vehicle, and a condition related to centering of vehicles in the lane of the vehicle.

In some embodiments, the rescue lane scenario is determined based on satisfaction of rescue lane conditions associated with the rescue lane scenario, wherein the rescue lane conditions include at least one of: a condition related to a type of road, a condition related to an emergency lane, a condition related to traffic speed in a lane of the vehicle, a condition related to traffic speed in a lane adjacent to the lane of the vehicle, and a condition related to biasing of vehicles in the lane of the vehicle.

In some embodiments, the rescue lane scenario is determined based on detection data associated with the environment.

In some embodiments, the vehicle is in a middle lane of a road of the environment, and wherein the amount of lateral biasing is based on a predetermined minimum distance between a right side of the vehicle and a left side of another vehicle in a lane adjacent to the middle lane.

In some embodiments, the vehicle is laterally biased to the left of a lane of the vehicle based on the lane being a leftmost lane of a road of the environment or the vehicle is laterally biased to the right of the lane of the vehicle based on the lane being a middle lane or a rightmost lane of the road of the environment.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
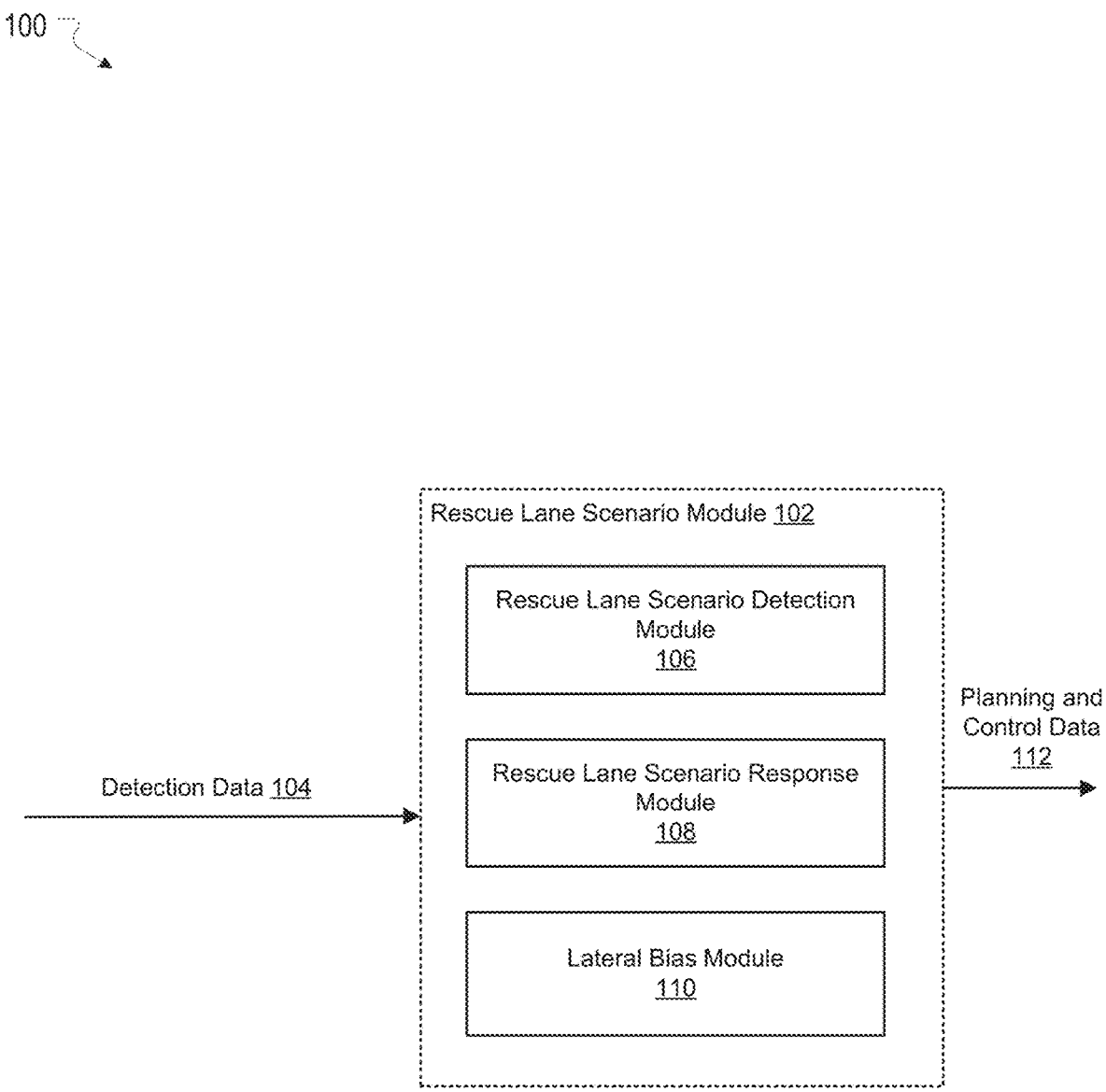
FIG. 1 illustrates an example system associated with rescue lane scenarios, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Vehicle Control in Rescue Lane Scenarios

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change.

Understanding an environment in which a vehicle having an autonomous system for navigation (e.g., ego vehicle) is travelling is fundamental to planning and control functions of the vehicle. For example, a truck travelling in an environment can plan a safe route to travel in the environment based on an understanding of the environment. An understanding of an environment can involve identifying obstacles such as other vehicles, pedestrians, traffic signals, objects, etc. An autonomous system for navigation of a vehicle can plan and control motion of the vehicle in response to the identified obstacles. The understanding of the environment can also involve determining a scenario related to the environment. The scenario can describe circumstances, conditions, or situations occurring in the environment. The autonomous system for navigation of the vehicle can plan and control the motion of the vehicle as appropriate for the scenario.

However, under conventional approaches, determination of a scenario as well as planning and controlling motion of a vehicle based on the scenario pose various technological challenges. For example, various jurisdictions have legal requirements for vehicles in slow traffic or stopped traffic to provide an access lane (e.g., rescue lane) that allows emergency vehicles to travel through the slow traffic or the stopped traffic. To create the access lane, all the vehicles in the slow traffic or the stopped traffic should move in accordance with the legal requirements. If one of the vehicles fails to move appropriately, then the access lane may be blocked, denying the emergency vehicles the ability to advance. In these various jurisdictions, an autonomous system for navigation of a vehicle may fail to identify a scenario in which an access lane for emergency vehicles is to be provided (e.g., a rescue lane scenario). If the autonomous system for navigation fails to determine the scenario, the autonomous system for navigation may fail to plan and control motion of the vehicle in accordance with legal requirements, thereby blocking access for emergency vehicles. Conventional approaches of autonomous systems for navigation can fail to determine a rescue lane scenario and fail to plan and control motion for the rescue lane scenario.

The present technology provides improved approaches for determination of a rescue lane scenario and improved approaches for planning and controlling motion for the rescue lane scenario that overcome the aforementioned and other technological challenges. In various embodiments, the present technology can automatically determine a rescue lane scenario for an environment based on detection data captured at the environment. The detection data can include sensor data captured at the environment and detected obstacles or detected objects that were detected based on the sensor data. The rescue lane scenario can be determined based on satisfaction of rescue lane scenario conditions. The rescue lane scenario conditions can include various conditions, such as existence of multiple lanes in a direction of an ego vehicle, lack of emergency lanes, slow traffic or stopped traffic in a lane of the ego vehicle, slow traffic or stopped traffic in adjacent lanes of the lane of the ego vehicle, and lateral bias of vehicles in the lane of the ego vehicle. Satisfaction of the rescue lane scenario conditions can indicate occurrence of the rescue lane scenario. Based on the determination of the rescue lane scenario, planning and control data can be generated for appropriate responses to the rescue lane scenario. The responses can include, for example, generating an alert about the rescue lane scenario, maintaining speed relative to traffic, and laterally biasing to provide a rescue lane. The responses can be in accordance with legal requirements associated with the rescue lane scenario.

As just one example, a vehicle navigating an environment can capture sensor data at the environment. Based on the sensor data, the vehicle can determine that the vehicle is travelling in the rightmost lane of a divided highway with three lanes in a direction traveled by the vehicle. The vehicle can determine, based on the sensor data, that the divided highway does not have an emergency lane. The vehicle can determine, based on the sensor data, that traffic in the right lane (e.g., the same lane as the vehicle) is moving less than a threshold speed (e.g., 10 miles per hour, 5 miles per hour) and laterally biased to the right of the lane. The vehicle can determine that traffic in the middle lane (e.g., to the left of the vehicle) is moving less than the threshold speed and laterally biased to the right of the middle lane. Based on these determinations, the vehicle can identify a rescue lane scenario for the environment. Based on the determination of the rescue lane scenario, the vehicle can respond by generating an alert for a driver of the vehicle. The alert can indicate to the driver that a rescue lane scenario has been determined. The vehicle can automatically respond, based on the determination of the rescue lane scenario, by laterally biasing to the right of the right lane and maintaining speed relative to the traffic in the right lane. Thus, the vehicle can respond appropriately to the rescue lane scenario, in accordance with legal requirements, without disengaging an autonomous system for navigation or requiring manual intervention. Thus, the present technology provides improved approaches for determination of a rescue lane scenario and improved approaches for planning and controlling motion for the rescue lane scenario. These and other inventive features and related advantages of the various embodiments of the present technology are discussed in more detail herein.

FIG. 1 illustrates an example system 100 including a rescue lane scenario module 102, according to some embodiments of the present technology. In some embodiments, the rescue lane scenario module 102 can provide support for various functions of an autonomous system of navigation of any type of vehicle (or ego vehicle), such as a truck. The rescue lane scenario module 102 can generate planning and control data 112. The planning and control data 112 can include, for example, instructions for lateral bias of a vehicle. The rescue lane scenario module 102 can support or be implemented as part of a planning function or a control function of an autonomous system of a vehicle, such as a prediction and planning module 616 or a control module 618 of an autonomous system 610 of FIG. 6, as discussed in more detail below. Alternatively or additionally, the rescue lane scenario module 102 can support or be implemented as part of a perception function of an autonomous system of a vehicle, such as a perception module 612 of the autonomous system 610 of FIG. 6, as discussed in more detail below. The rescue lane scenario module 102 can generate the planning and control data 112 based on various data, such as detection data 104, which are discussed in more detail below. The rescue lane scenario module 102 can generate the planning and control data 112 based on various machine learning methodologies. For example, the rescue lane scenario module 102 can train a machine learning model to generate planning and control data 112 based on the detection data 104. While determination of a rescue lane scenario and generation of planning and control data for the rescue lane scenario are discussed herein as an example application of the present technology, various other applications, such as determination of various scenarios and generation of planning and control data for the various scenarios are possible in accordance with the present technology.

In some embodiments, some or all of the functionality performed by the rescue lane scenario module 102 may be performed by one or more computing systems implemented in a vehicle. In some embodiments, some or all of the functionality performed by the rescue lane scenario module 102 may be performed by one or more backend computing systems (e.g., remote from a vehicle). In some embodiments, some or all of the functionality performed by the rescue lane scenario module 102 may be performed by one or more computing systems associated with (e.g., carried by) one or more users riding in a vehicle. In some embodiments, some or all data processed and/or stored by the rescue lane scenario module 102 can be stored in a data store (e.g., local to the rescue lane scenario module 102) or other storage system (e.g., cloud storage remote from rescue lane scenario module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the rescue lane scenario module 102 can be implemented in any suitable combinations. Functionalities of the rescue lane scenario module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The rescue lane scenario module 102 can include a rescue lane scenario detection module 106. The rescue lane scenario detection module 106 can determine a rescue lane scenario in an environment based on detection data associated with the environment, such as the detection data 104. The detection data can include, for example, sensor data captured at the environment. The sensor data can be captured, for example, by one or more sensors (e.g., camera sensor, LiDAR sensor, radar sensor, GPS sensor) equipped on an ego vehicle. The detection data can include, for example, detected obstacles or detected objects in the environment. For example, the detection data can include detected vehicles, detected construction signs, detected lane markings, detected road boundaries, etc. The detection data can include information related to the detected obstacles or detected objects in the environment. For example, the detection data can include distances between the ego vehicle and the detected obstacles or the detected objects, whether the detected obstacles or the detected objects are static (e.g., not moving) or dynamic (e.g., moving), positions of the detected obstacles or the detected objects in the environment, speeds of the detected obstacles or the detected objects, and directions of the detected obstacles or the detected objects. In some cases, detection data can be supplemented with map data. The map data can include information related to an environment, such as a type of road (e.g., divided highway, freeway, roadway) in the environment and information about the road (e.g., number of lanes, presence of emergency lanes). Based on the detection data, a scenario for the environment can be determined.

The rescue lane scenario detection module 106 can determine a rescue lane scenario for an environment based on the detection data associated with the environment. The rescue lane scenario can be determined based on satisfaction of various rescue lane conditions associated with the rescue lane scenario. The rescue lane conditions can include a condition related to a type of road. The condition related to the type of road can be satisfied if a road is a divided highway, a freeway, or a roadway with at least two lanes in a direction of an ego vehicle. The condition related to the type of road can reflect legal requirements, which may not require rescue lanes on city streets. The condition related to the type of road can reflect whether a rescue lane is practical as a road with only one lane may not have sufficient space for a rescue lane. The rescue lane conditions can include a condition related to emergency lanes. The condition related to emergency lanes can be satisfied if a road does not have an emergency lane or a shoulder lane. The condition related to emergency lanes can reflect legal requirements, which may not require rescue lanes where an emergency lane or a shoulder lane is available for an emergency vehicle to use. The rescue lane conditions can include a condition related to traffic speed in a lane of an ego vehicle. The condition related to traffic speed in the lane of the ego vehicle can be satisfied if vehicles in the lane of the ego vehicle are stopped or travelling with an average speed below a threshold speed (e.g., 5 miles per hour, 10 miles per hour, 15 miles per hour). The rescue lane conditions can include a condition related to traffic speed in lanes adjacent to the lane of the ego vehicle. The condition related to traffic speed in the lanes adjacent to the lane of the ego vehicle can be satisfied if vehicles in the lanes adjacent to the lane of the ego vehicle are stopped or travelling with an average speed below a threshold speed (e.g., 5 miles per hour, 10 miles per hour, 15 miles per hour). In some cases, the threshold speed associated with the condition related to traffic speed in the lanes adjacent to the lane of the ego vehicle can be the same as the threshold speed associated with the condition related to traffic speed in the lane of the ego vehicle. The rescue lane conditions can include a condition related to biasing of vehicles in the lane of the ego vehicle. The condition related to biasing of the vehicles in the lane of the ego vehicle can be satisfied if the vehicles in the lane of the ego vehicle are laterally biased to a side of the lane of the ego vehicle. In cases where the lane of the ego vehicle is a lane other than the leftmost lane of a road, the condition related to biasing of the vehicles in the lane of the ego vehicle can be satisfied if the vehicles in the lane of the ego vehicle are laterally biased to the right of the lane of the ego vehicle. In some cases where the lane of the ego vehicle is the leftmost lane of a road, the condition related to biasing of the vehicles in the lane of the ego vehicle can be satisfied if the vehicles in the lane of the ego vehicle are laterally biased to the left of the lane of the ego vehicle. A rescue lane scenario for an environment can be determined based on satisfaction of all or some of the rescue lane conditions described herein and other possible rescue lane conditions. While the various illustrations discussed herein can apply to roads designed for driving on the right side, the present technology also applies analogously to roads designed for driving on the left side. Based on the determination of the rescue lane scenario, planning and control data can be generated for appropriate responses to the rescue lane scenario.

The rescue lane scenario detection module 106 can determine that a rescue lane scenario for an environment is ended based on the detection data associated with the environment. The end of the rescue lane scenario can be determined based on satisfaction of various rescue lane end conditions associated with the end of the rescue lane scenario. The rescue lane end conditions can include a condition related to increased traffic speed in a lane of an ego vehicle. The condition related to increased traffic speed in the lane of the ego vehicle can be satisfied if vehicles in the lane of the ego vehicle are travelling with an increasing average speed or an average speed over a threshold speed (e.g., 5 miles per hour, 10 miles per hour, 15 miles per hour). The rescue lane end conditions can include a condition related to increased traffic speed in lanes adjacent to the lane of the ego vehicle. The condition related to increased traffic speed in the lanes adjacent to the lane of the ego vehicle can be satisfied if vehicles in the lanes adjacent to the lane of the ego vehicle are travelling with an increasing average speed or an average speed over a threshold speed (e.g., 5 miles per hour, 10 miles per hour, 15 miles per hour). The rescue lane end conditions can include a condition related to centering of vehicles in the lane of the ego vehicle. The condition related to centering of vehicles in the lane of the ego vehicle can be satisfied if the vehicles in the lane of the ego vehicle are no longer laterally biased to a side of the lane of the ego vehicle or if the vehicles in the lane of the ego vehicle are centered in a middle of the lane of the ego vehicle. An end of a rescue lane scenario for an environment can be determined based on satisfaction of all or some of the rescue lane end conditions described herein or other rescue lane end conditions. Based on the determination of the end of the rescue lane scenario, planning and control data can be generated for an ego vehicle to resume normal driving behavior.

For example, an ego vehicle navigating an environment can capture sensor data at the environment. Based on the sensor data, the ego vehicle can determine that rescue lane conditions for a rescue lane scenario are satisfied. In this example, the ego vehicle can determine, based on the sensor data, that the ego vehicle is travelling in a middle lane of a freeway with three lanes in a direction of travel of the ego vehicle. Thus, the ego vehicle can determine that a rescue lane condition related to a type of road is satisfied. The ego vehicle can determine, based on the sensor data, that the freeway does not have an emergency lane or a shoulder lane. Accordingly, the ego vehicle can determine that a rescue lane condition related to emergency lanes is satisfied. The ego vehicle can determine, based on the sensor data, that other vehicles in the middle lane of the freeway (e.g., a lane of the ego vehicle) are stopped. As a result, the ego vehicle can determine that a rescue lane condition related to traffic speed in a lane of the ego vehicle is satisfied. The ego vehicle can determine, based on the sensor data, that other vehicles in the right lane and the left lane of the freeway (e.g., lanes adjacent to the lane of the ego vehicle) are stopped. Therefore, the ego vehicle can determine that a rescue lane condition related to traffic speed in lanes adjacent to the lane of the ego vehicle is satisfied. The ego vehicle can determine, based on the sensor data, that the other vehicles in the middle lane of the freeway are laterally biased to the right of the middle lane. Accordingly, the ego vehicle can determine that a rescue lane condition related to biasing of the other vehicles in the lane of the ego vehicle is satisfied. Based on satisfaction of the rescue lane conditions described in this example, the ego vehicle can determine the occurrence of a rescue lane scenario for the environment. Based on the determination of the rescue lane scenario, the ego vehicle can generate planning and control data for appropriate responses to the rescue lane scenario. Many variations are possible.

The rescue lane scenario module 102 can include a rescue lane scenario response module 108. The rescue lane scenario response module 108 can generate planning and control data, such as planning and control data 112, for appropriate responses to a rescue lane scenario. In some embodiments, the responses can be automatically provided or performed by an autonomous system of navigation of an ego vehicle. A response to a rescue lane scenario can involve generating an alert for a driver of an ego vehicle. The alert can indicate that the rescue lane scenario has been identified. The alert can provide options for the driver to engage manual control of the ego vehicle. For example, the driver can engage manual control of the ego vehicle by actively taking manual control (e.g., control steering through a steering wheel, control speed through a gas pedal or a brake pedal) or by selecting an option identified or provided through the alert. A response to the rescue lane scenario can involve maintaining control of an ego vehicle relative to traffic. Maintaining control of the ego vehicle relative to traffic can include, for example, maintaining speed relative to a leading vehicle in front of the ego vehicle. For example, the ego vehicle can determine a speed of the leading vehicle in front of the ego vehicle and control the ego vehicle to match the speed of the leading vehicle. Maintaining control of the ego vehicle relative to traffic can include prevention of lane change behavior. During the rescue lane scenario, the vehicle may identify opportunities to make a lane change. However, the ego vehicle can refrain from making lane changes when the ego vehicle identifies these opportunities to make a lane change. A response to the rescue lane scenario can involve laterally biasing the ego vehicle to a side of a lane. The ego vehicle can determine an amount of lateral bias by which to position itself toward the side of the lane. In cases where the ego vehicle is in a lane other than the leftmost lane of a road, the ego vehicle can laterally bias to the right of the lane. In some cases, the ego vehicle may be in the leftmost lane of the road. In these cases, the ego vehicle can laterally bias to the left of the lane. In some cases, the ego vehicle can laterally bias past lane markings on the road based on the amount of lateral bias determined by the ego vehicle in accordance with applicable safety considerations. The ego vehicle can maintain the lateral bias for a duration of the rescue lane scenario or until an end of the rescue lane scenario is determined.

The rescue lane scenario response module 108 can generate planning and control data for appropriate responses to an end of a rescue lane scenario. In some embodiments, the responses can be automatically provided or performed by the autonomous system of navigation of the ego vehicle. A response to an end of a rescue lane scenario can involve generation of an alert for a driver of an ego vehicle. The alert can indicate that the end of the rescue lane scenario has been determined. The alert can provide options for the driver to engage manual control of the ego vehicle. For example, the driver can engage manual control of the ego vehicle by actively taking manual control or by selecting an option provided through the alert. A response to the end of the rescue lane scenario can involve increasing speed to match traffic. Thus, as other vehicles in a lane of the ego vehicle increase speed in accordance with the end of the rescue lane scenario, the ego vehicle can increase speed based on the increase in speed of the other vehicles. A response to the end of the rescue lane scenario can involve permitting lane change behavior. In this regard, after the end of the rescue lane scenario, the ego vehicle may identify opportunities to make a lane change. The ego vehicle can make the lane change based on normal prediction and planning functions and normal control functions that do not involve constraints associated with a rescue lane scenario. A response to the end of the rescue lane scenario can involve centering to a middle of a lane. Accordingly, the ego vehicle can return to the middle of the lane based on normal prediction and planning functions and normal control functions.

For example, an ego vehicle navigating an environment can determine a rescue lane scenario for the environment based on satisfaction of rescue lane conditions. Based on the determination of the rescue lane scenario, the ego vehicle can generate planning and control data to maintain speed of the ego vehicle based on a leading vehicle in front of the ego vehicle. The ego vehicle can determine an amount of lateral bias by which to laterally bias to a side of a lane in which the ego vehicle is travelling. The ego vehicle can generate planning and control data to laterally bias to the side of the lane based on the amount of lateral bias. Continuing this example, the ego vehicle can determine an end of the rescue lane scenario based on satisfaction of rescue lane end conditions. Based on the determination of the end of the rescue lane scenario, the ego vehicle can generate planning and control data to increase speed of the ego vehicle based on speeds of other vehicles in the lane of the vehicle. The ego vehicle can generate planning and control data to return to a middle of the lane. Many variations are possible.

The rescue lane scenario module 102 can include a lateral bias module 110. The lateral bias module 110 can determine an amount of lateral bias by which an ego vehicle can laterally bias to a side of a lane. In some cases, the amount of lateral bias can be determined based on lane markings of the lane. The amount of lateral bias can be determined such that the right side of the ego vehicle is aligned with the right side lane markings of the lane. In some cases, the amount of lateral bias can be determined based on a road on which the ego vehicle is travelling. In cases where the ego vehicle is travelling in the rightmost lane of a road, the amount of lateral bias can be determined based on available drivable road surface beyond the right edge (right side lane markings) of the rightmost lane. The amount of lateral bias can be determined so that a predetermined minimum distance (e.g., 0.25 meters, 0.5 meters) between the right side of the ego vehicle and the right edge of the available drivable road surface is maintained. The amount of lateral bias can be determined based on roadside infrastructure, such as guard rails, road curbs, construction signs, etc. The amount of lateral bias can be determined so that a predetermined minimum distance between the right side of the ego vehicle and the roadside infrastructure is maintained. In cases where the ego vehicle is travelling in a middle lane of a road, the amount of lateral bias can be determined based on other vehicles to the right of the ego vehicle. The amount of lateral bias can be determined so that a predetermined minimum distance between the right side of the ego vehicle and the left sides of the other vehicles is maintained. In some cases, the amount of lateral bias can be determined based on vehicles in the lane of the ego vehicle. An average amount of lateral bias of the vehicles in the lane of the ego vehicle can be determined. The amount of lateral bias by which the ego vehicle can laterally bias to the side of the lane can be based on the average amount of lateral bias of the vehicles in the lane of the ego vehicle. In the determination of the average amount of lateral bias of the vehicles in the lane of the ego vehicle, some vehicles that exceed or satisfy a threshold difference in lateral bias from the average amount of lateral bias (e.g., certain outliers) can be excluded from the determination of the average amount of lateral bias.

Likewise, in cases where an ego vehicle is travelling in a leftmost lane of a road, an amount of lateral bias can be determined based on lane markings of the lane. The amount of lateral bias can be determined such that the left side of the ego vehicle is aligned with the left side lane markings of the lane. In some cases, the amount of lateral bias can be determined based on available drivable road surface beyond the left edge of the leftmost lane or based on roadside infrastructure to the left of the ego vehicle. The amount of lateral bias can be determined so that a predetermined minimum distance between the left side of the ego vehicle and the left edge of the available drivable road surface or the roadside infrastructure is maintained.

For example, an ego vehicle navigating an environment can determine a rescue lane scenario for the environment and, based on the determination of the rescue lane scenario, generate planning and control data to laterally bias the ego vehicle to a side of a lane in which the ego vehicle is travelling. In this example, the ego vehicle can be travelling in the rightmost lane. The ego vehicle can determine an amount of lateral bias based on available drivable road surface to the right of the ego vehicle. The amount of lateral bias can be such that the right side of the ego vehicle maintains a predetermined minimum distance from the edge of the available drivable road surface to the right of the ego vehicle. Many variations are possible.

Figure 2:
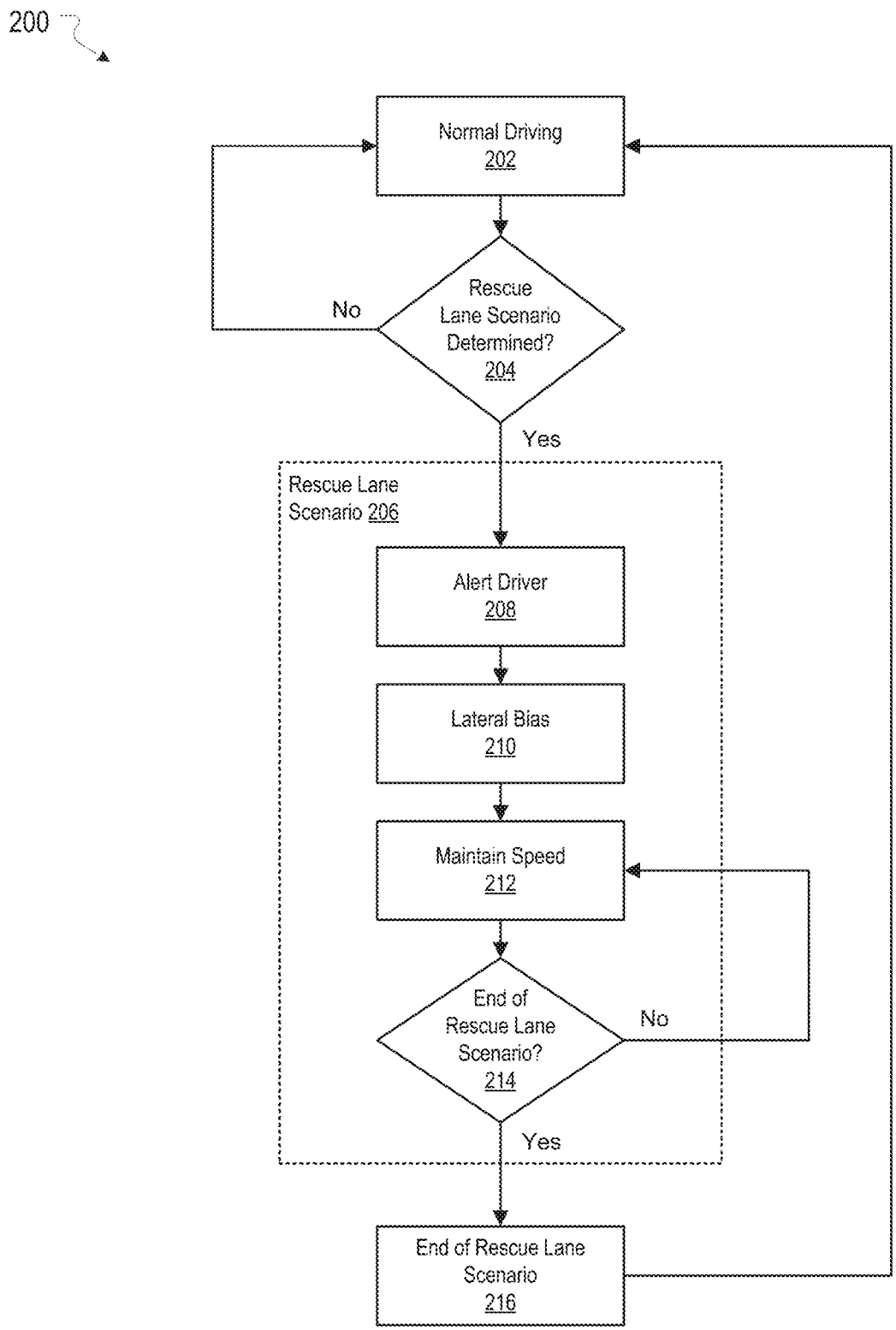
FIG. 2 illustrates an example block diagram associated with rescue lane scenarios, according to embodiments of the present technology.

FIG. 2 illustrates an example block diagram 200 associated with rescue lane scenarios, according to some embodiments of the present technology. The various functionality described herein for rescue lane scenarios can be performed by, for example, the rescue lane scenario module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, operation of a vehicle (or ego vehicle) navigating an environment can begin at block 202. At block 202, the vehicle performs normal driving in the environment. At block 204, the possible occurrence of a rescue lane scenario for the environment is determined by the vehicle. If the vehicle does not determine the rescue lane scenario, then operation of the vehicle returns to block 202, where the vehicle performs normal driving in the environment. If the vehicle determines the rescue lane scenario, then at block 206, operations for the rescue lane scenario are performed. At block 208, the vehicle generates an alert for a driver of the vehicle. At block 210, the vehicle determines an amount of lateral bias and laterally biases itself based on the amount of lateral bias. At block 212, the vehicle maintains speed based on a leading vehicle in front of the vehicle. At block 214, the possible occurrence of an end of the rescue lane scenario is determined by the vehicle. If the vehicle does not determine the end of the rescue lane scenario, then operation of the vehicle returns to block 212, where the vehicle maintains speed based on the leading vehicle in front of the vehicle. If the vehicle determines the end of the rescue lane scenario, then at block 216, the vehicle performs operations for the end of rescue lane scenario. The operations can include increasing speed based on other vehicles in the lane of the vehicle and centering to the middle of the lane. Operation of the vehicle can return to block 202, where the vehicle performs normal driving in the environment. Many variations are possible.

Figure 3A:
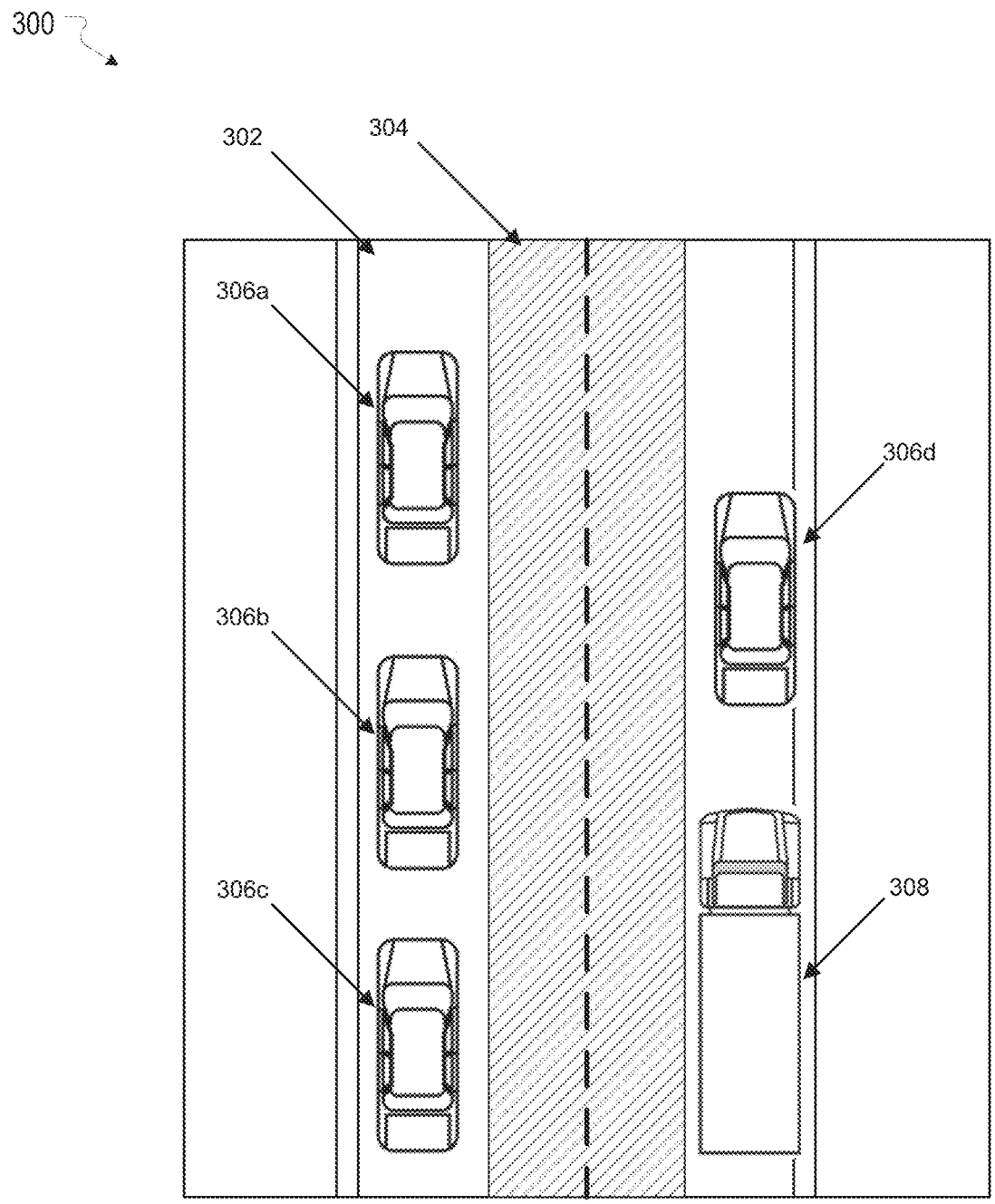
FIGS. 3A-3C illustrate examples associated with rescue lane scenarios, according to embodiments of the present technology.
Figure 3B:
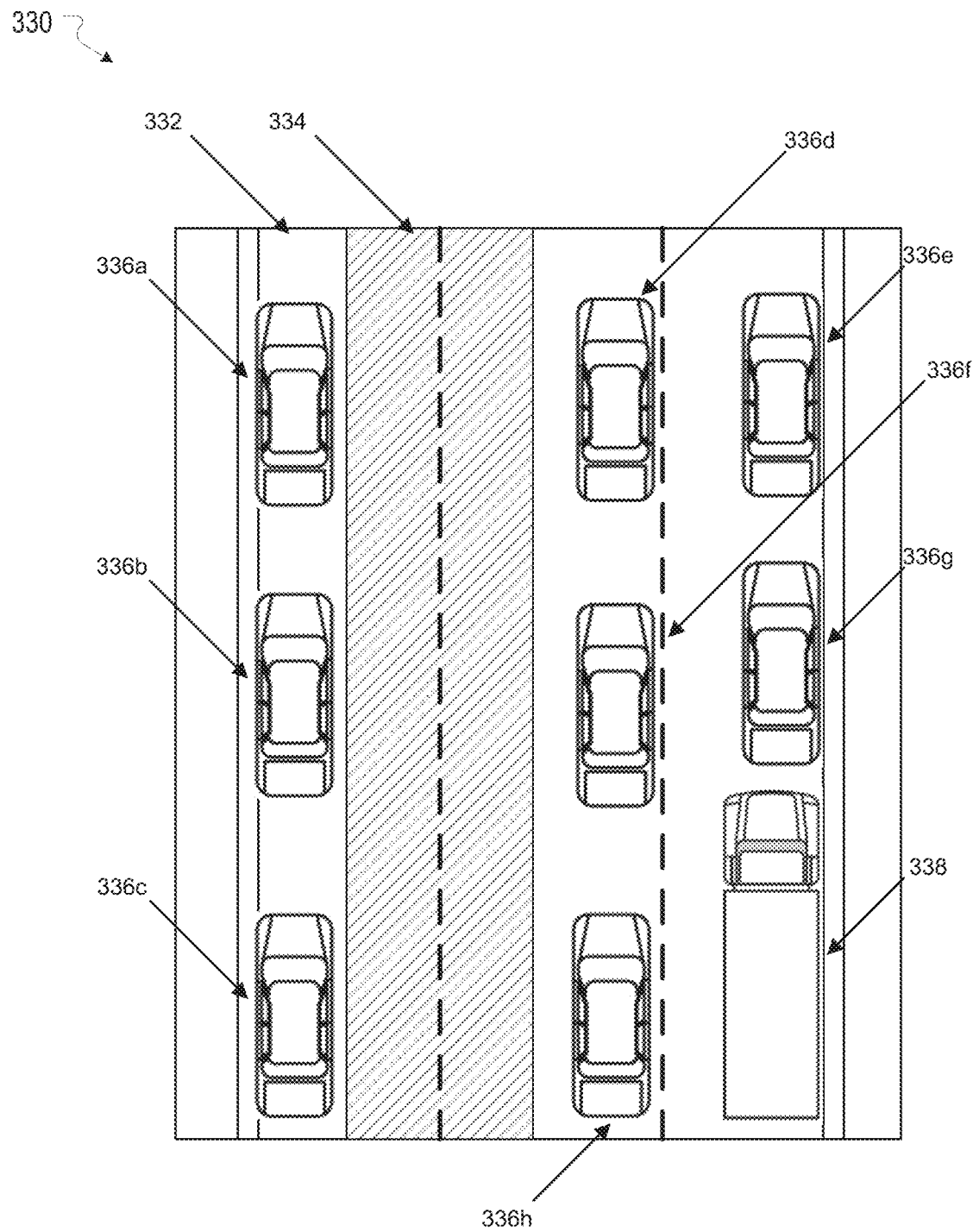
Figure 3C:
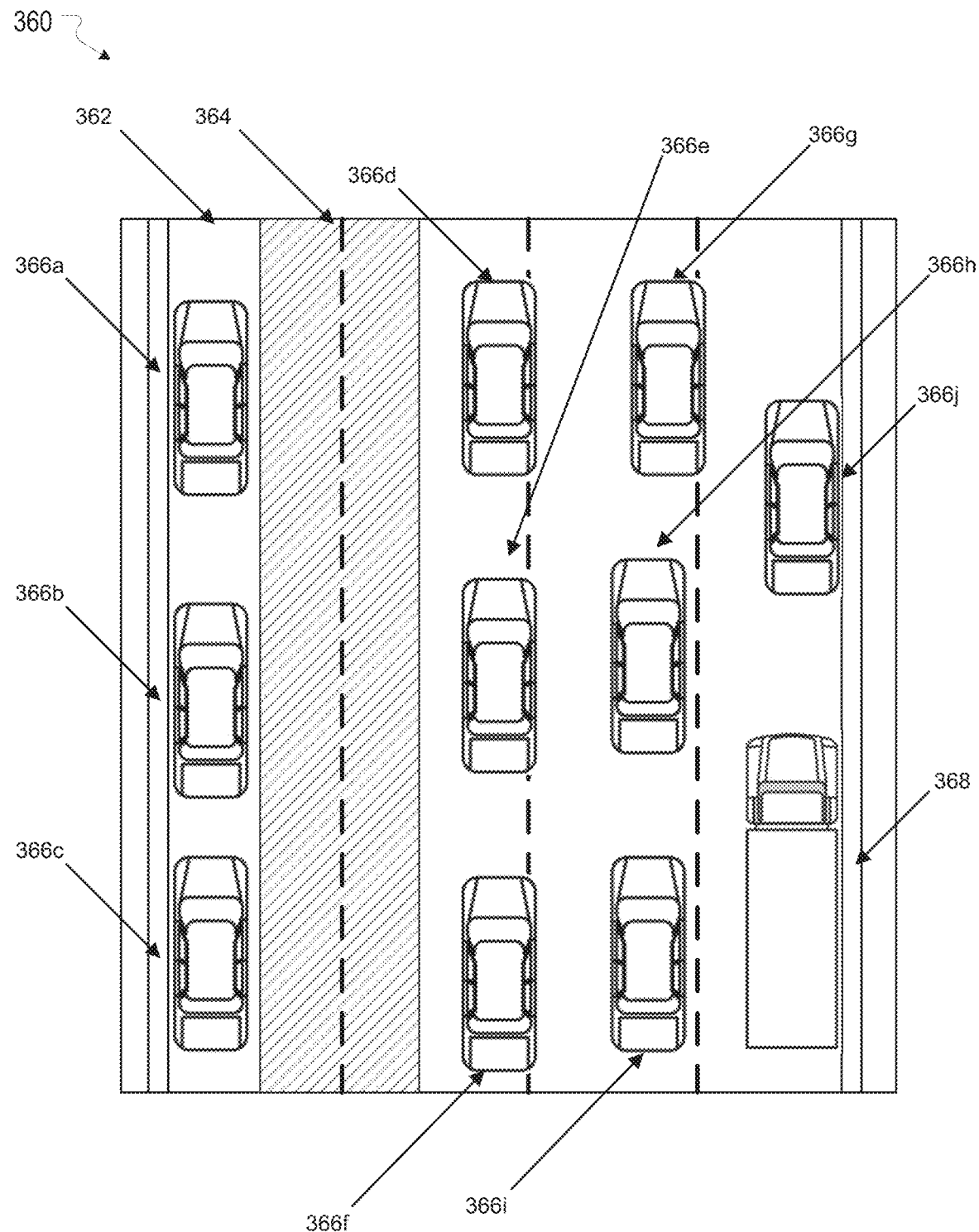

FIGS. 3A-3C illustrate examples associated with rescue lane scenarios, according to some embodiments of the present technology. The various functionality described herein for rescue lane scenarios can be performed by, for example, the rescue lane scenario module 102 of FIG. 1. It should be understood that there can be additional, fewer, or alternative functionality or steps performed in similar or alternative orders, or in parallel, based on the various features and embodiments discussed herein unless otherwise stated.

FIG. 3A illustrates an example 300 of a rescue lane scenario. As illustrated in FIG. 3A, vehicles 306a, 306b, 306c, 306d and a truck 308 are travelling on a two lane roadway 302. Vehicles 306a, 306b, 306c have laterally biased to the left of the left lane of the two lane roadway 302. Vehicle 306d and the truck 308 have laterally biased to the right of the right lane of the two lane roadway 302. Based on the lateral biasing of the vehicles 306a, 306b, 306c, 306d and the truck 308, a rescue lane 304 has been formed to allow access by emergency vehicles. Many variations are possible.

FIG. 3B illustrates an example 330 of a rescue lane scenario. As illustrated in FIG. 3B, a three lane roadway 332 has vehicles 336a, 336b, 336c, 336d, 336e, 336f, 336g, 336h and a truck 338. Vehicles 336a, 336b, 336c have laterally biased to the left of the left lane of the three lane roadway 332. Vehicles 336d, 336f, 336h have laterally biased to the right of the middle lane of the three lane roadway 332. Vehicles 336e, 336g and the truck 338 have laterally biased to the right of the right lane of the three lane roadway 332. Based on the lateral biasing of the vehicles 336a, 336b, 336c, 336d, 336e, 336f, 336g, 336h and the truck 338, a rescue lane 334 has been formed to permit travel by emergency vehicles. Many variations are possible.

FIG. 3C illustrates an example 360 of a rescue lane scenario. As illustrated in FIG. 3C, a four lane roadway 362 has vehicles 366a, 366b, 366c, 366d, 366e, 366f, 366g, 366h, 366i, 366j and a truck 368. Vehicles 366a, 366b, 366c have laterally biased to the left of the far left lane of the four lane roadway 362. Vehicles 366d, 366e, 366f, 366g, 366h, 366i have laterally biased to the right of the two middle lanes of the four lane roadway 362. Vehicle 366j and the truck 368 have laterally biased to the right of the far right lane of the four lane roadway 362. Based on the lateral biasing of the vehicles 366a, 366b, 366c, 366d, 366e, 366f, 366g, 366h, 366i, 366j and the truck 368, a rescue lane 364 has been formed to allow emergency vehicles to progress along the four lane roadway 362. Many variations are possible.

Figure 4A:
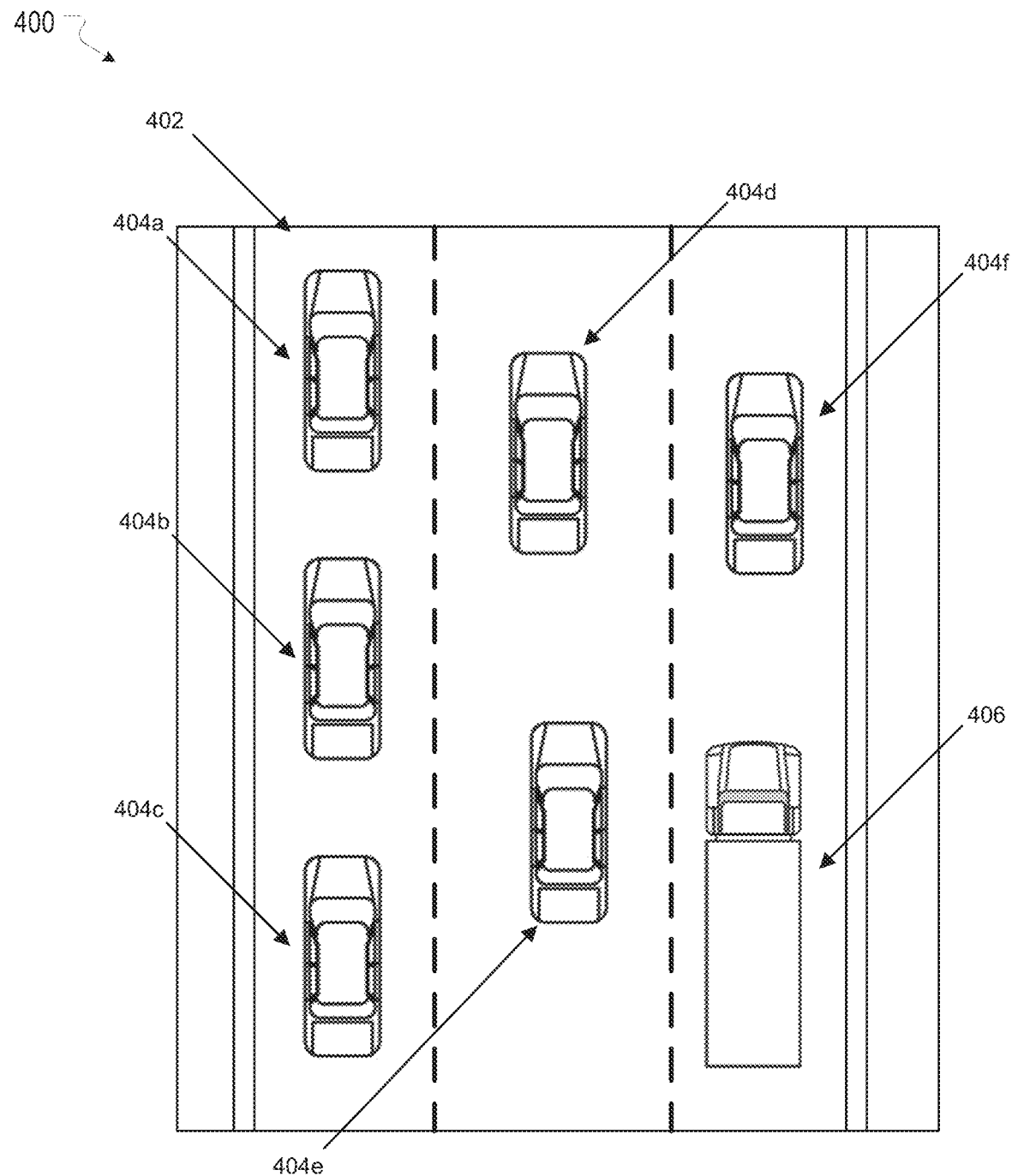
FIGS. 4A-4B illustrate examples associated with rescue lane scenarios, according to embodiments of the present technology.
Figure 4B:
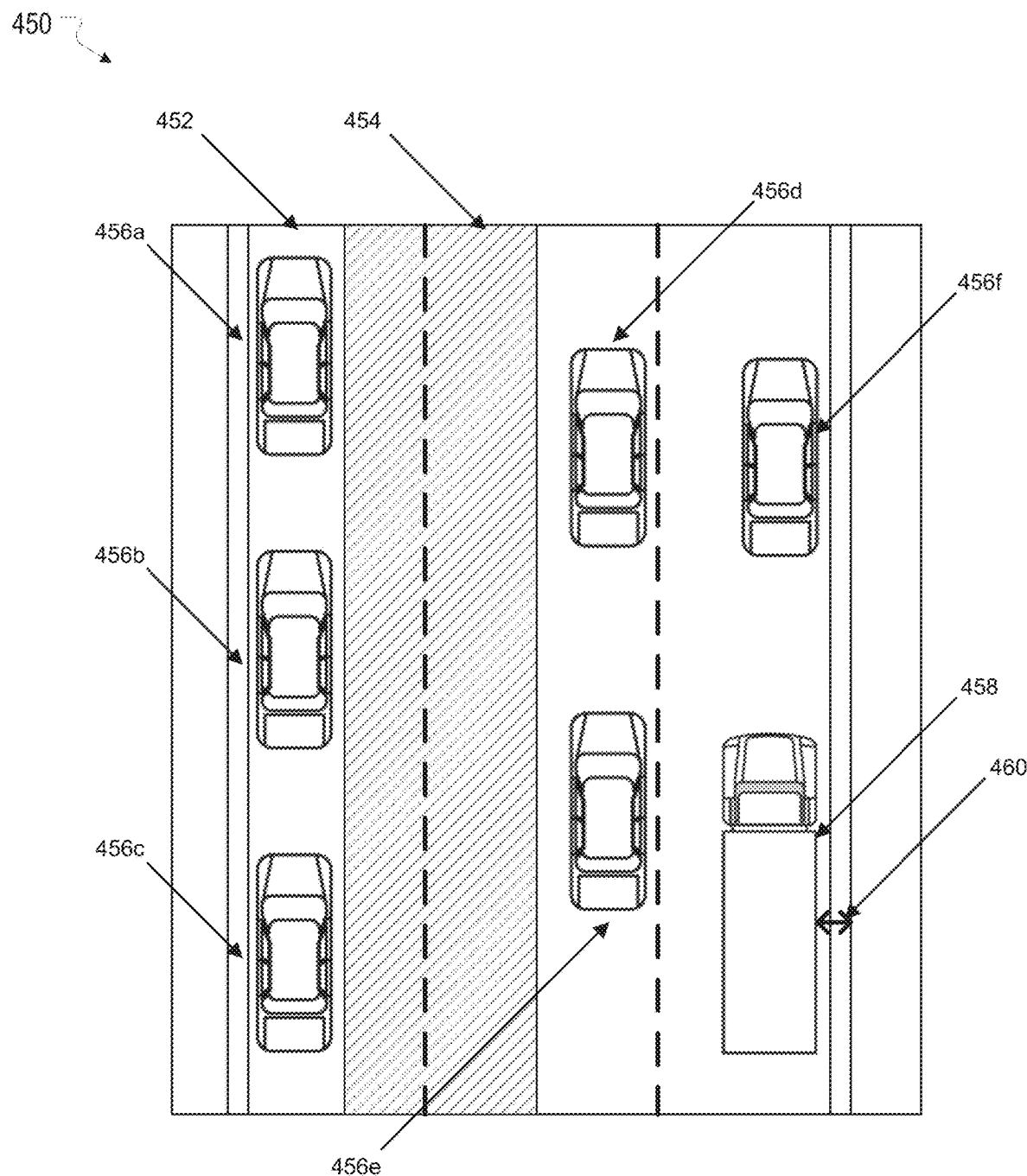

FIGS. 4A-4B illustrate examples of rescue lane scenarios, according to some embodiments of the present technology. The various functionality described herein for rescue lane scenarios can be performed by, for example, the rescue lane scenario module 102 of FIG. 1. It should be understood that there can be additional, fewer, or alternative functionality or steps performed in similar or alternative orders, or in parallel, based on the various features and embodiments discussed herein unless otherwise stated.

FIG. 4A illustrates an example 400 of a rescue lane scenario. As illustrated in FIG. 4A, a three lane roadway 402 has vehicles 404a, 404b, 404c, 404d, 404e, 404f and a truck 406. In the example 400, the vehicles 404a, 404b, 404c, 404d, 404e, 404f and the truck 406 can be in a slow traffic situation and travelling below a threshold speed. Thus, the example 400 can illustrate a scenario where a rescue lane is to be formed. An autonomous system for navigation of the truck 406 can determine a rescue lane scenario based on the vehicle 404f, which is in a right lane ahead of the truck 406, travelling below the threshold speed and the vehicles 404d, 404e, which are in the middle lane adjacent to the right lane, travelling below the threshold speed. Many variations are possible.

FIG. 4B illustrates an example 450 of a rescue lane scenario. The example 450 can illustrate a response to a determination of a rescue lane scenario, such as in the example 400 of FIG. 4A. A three lane roadway 452 has vehicles 456a, 456b, 456c, 456d, 456e, 456f and a truck 458. In the example 450, the vehicles 456a, 456b, 456c have laterally biased to the left of the left lane of the three lane roadway 452. Vehicles 456d, 456e have laterally biased to the right of the middle lane of the three lane roadway 452. Vehicle 456f and the truck 458 have laterally biased to the right of the right lane of the three lane roadway 452. In response to the determination of the rescue lane scenario, the truck 458 can laterally bias so that there is a predetermined minimum distance 460 between the right side of the truck 458 and the edge of the available drivable road surface. Based on the lateral biasing of the vehicles 456a, 456b, 456c, 456d, 456e, 456f and the truck 458, a rescue lane 454 has been formed to allow emergency vehicles to progress along the three lane roadway 452. Many variations are possible.

Figure 5:
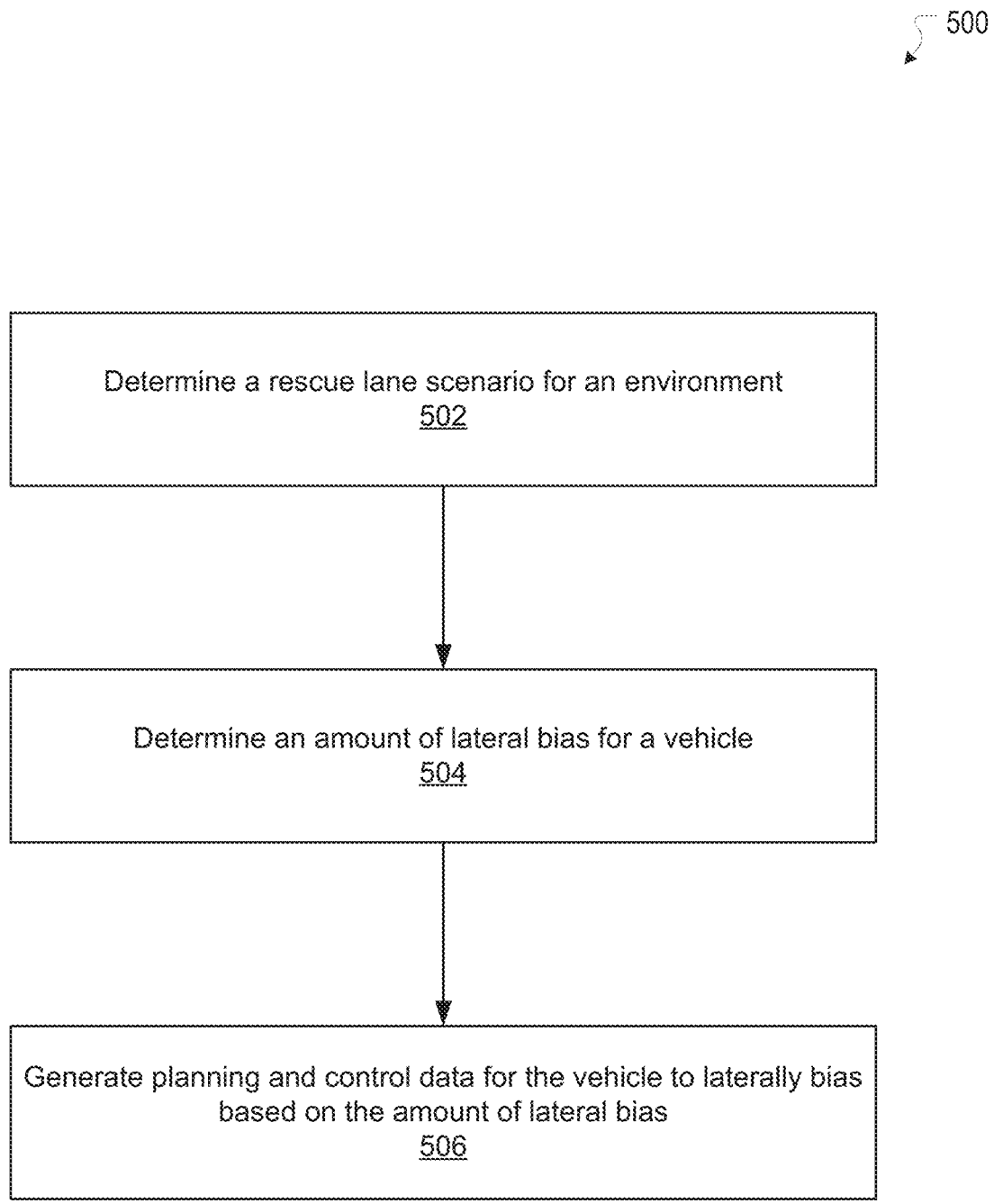
FIG. 5 illustrates an example method, according to embodiments of the present technology.

FIG. 5 illustrates an example method 500, according to embodiments of the present technology. At block 502, the example method 500 determines a rescue lane scenario for an environment. At block 504, the example method 500 determines an amount of lateral bias for a vehicle. At block 506, the example method 500 generates planning and control data for the vehicle to laterally bias based on the amount of lateral bias. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
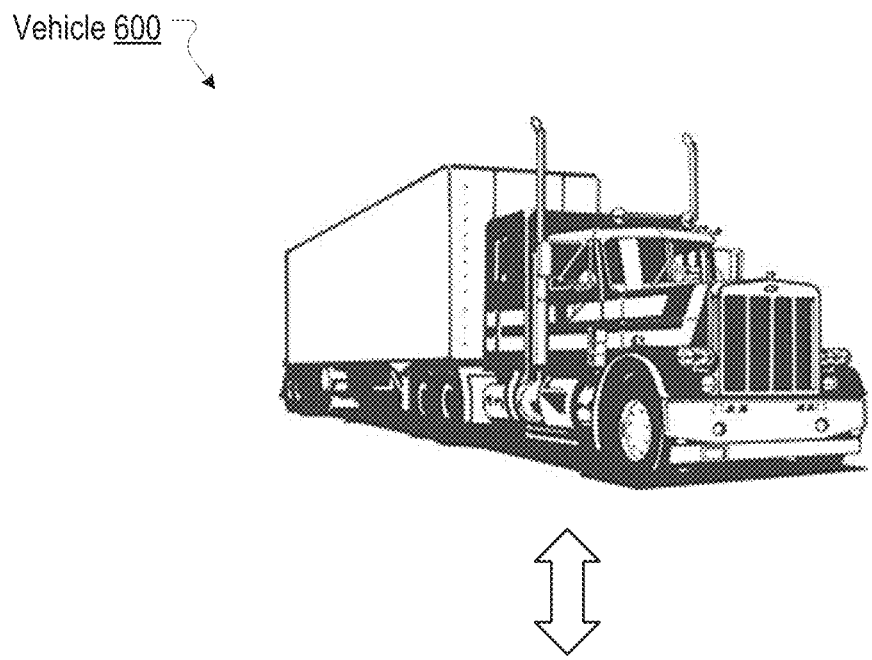
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 612 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 600 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
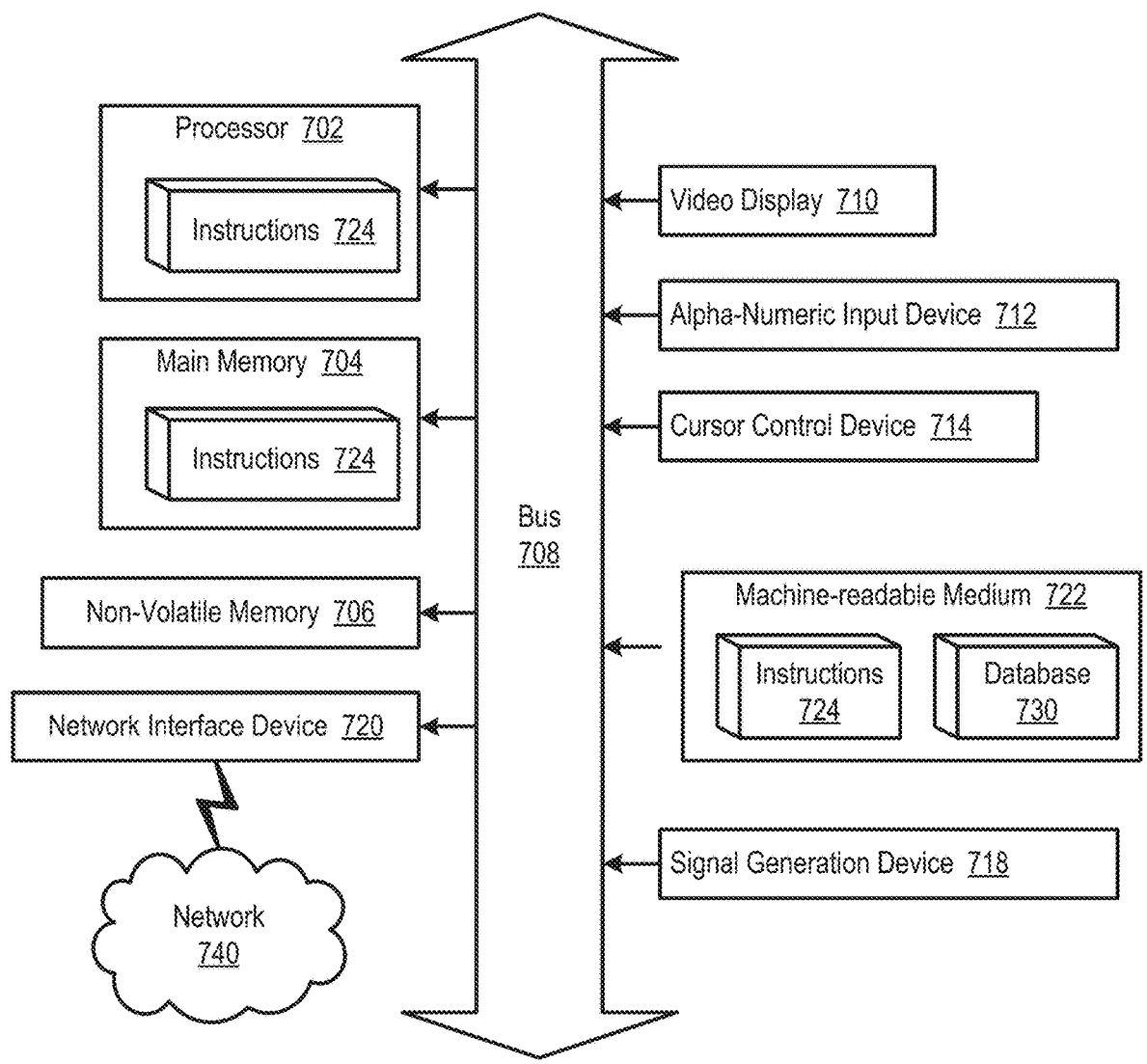
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a computing system, detection data associated with an environment;
   determining, by the computing system, map data associated with the environment, wherein the map data includes information associated with a presence of an emergency lane that is different from a rescue lane;

determining, by the computing system, a rescue lane scenario associated with the environment based on the map data and satisfaction of rescue lane conditions associated with the rescue lane scenario by the detection data; and generating, by the computing system, planning and control data for a vehicle based on the rescue lane scenario.

2. The computer-implemented method of claim 1, wherein the detection data includes information associated with at least one of detected vehicles, detected construction signs, detected lane markings, detected road boundaries, distances between the vehicle and detected obstacles, speeds of detected obstacles, and directions of detected obstacles.

3. The computer-implemented method of claim 1, wherein the map data further includes information associated with at least one of a type of road and a number of lanes.

4. The computer-implemented method of claim 1, wherein the rescue lane conditions include at least one of a condition satisfied by a road that includes at least two lanes in a direction of the vehicle, a condition satisfied by a road that lacks an emergency lane or a shoulder lane, a condition satisfied by a speed of vehicles in a lane of the vehicle below a threshold speed, a condition satisfied by a speed of vehicles in an adjacent lane to a lane of the vehicle below a threshold speed, and a condition satisfied by lateral biasing of vehicles in a lane of the vehicle.

5. The computer-implemented method of claim 1, wherein determining the rescue lane scenario associated with the environment comprises:

determining, by the computing system, the vehicle is in a leftmost lane of a road or the vehicle is in a rightmost lane of the road; and determining, by the computing system, vehicles in the leftmost lane of the road are laterally biased to a left of the leftmost lane or the vehicles in the rightmost lane of the road are laterally biased to a right of the rightmost lane.

6. The computer-implemented method of claim 1, wherein generating the planning and control data for the vehicle comprises:

generating, by the computing system, an alert for a driver of the vehicle;

determining, by the computing system, an amount of lateral bias;

causing, by the computing system, the vehicle to laterally bias based on the amount of lateral bias; and causing, by the computing system, the vehicle to maintain speed based on a leading vehicle in front of the vehicle.

7. The computer-implemented method of claim 1, wherein generating the planning and control data for the vehicle comprises:

identifying, by the computing system, an opportunity to make a lane change; and causing, by the computing system, the vehicle to refrain from making the lane change.

8. The computer-implemented method of claim 1, further comprising:

determining, by the computing system, an end of the rescue lane scenario based on satisfaction of rescue lane end conditions, wherein the rescue lane end conditions include at least one of a condition satisfied by a speed of vehicles in a lane of the vehicle over a threshold speed, a condition satisfied by a speed of vehicles in an adjacent lane to a lane of the vehicle over a threshold speed, and a condition satisfied by centering of vehicles in a lane of the vehicle.

9. The computer-implemented method of claim 8, further comprising:

generating, by the computing system, an alert for a driver of the vehicle;

causing, by the computing system, the vehicle to center to a middle of a lane of the vehicle; and causing, by the computing system, the vehicle to increase speed based on vehicles in the lane of the vehicle.

10. The computer-implemented method of claim 8, further comprising:

identifying, by the computing system, an opportunity to make a lane change; and causing, by the computing system, the vehicle to make the lane change based on the end of the rescue lane scenario.

11. A system comprising:

at least one processor; and a memory storing instructions that, when executed, cause the system to perform operations comprising:

determining detection data associated with an environment;

determining map data associated with the environment, wherein the map data includes information associated with a presence of an emergency lane that is different from a rescue lane;

determining a rescue lane scenario associated with the environment based on the map data and satisfaction of rescue lane conditions associated with the rescue lane scenario by the detection data; and generating planning and control data for a vehicle based on the rescue lane scenario.

12. The system of claim 11, wherein the detection data includes information associated with at least one of detected vehicles, detected construction signs, detected lane markings, detected road boundaries, distances between the vehicle and detected obstacles, speeds of detected obstacles, and directions of detected obstacles.

13. The system of claim 11, wherein the map data further includes information associated with at least one of a type of road and a number of lanes.

14. The system of claim 11, wherein the rescue lane conditions include at least one of a condition satisfied by a road that includes at least two lanes in a direction of the vehicle, a condition satisfied by a road that lacks an emergency lane or a shoulder lane, a condition satisfied by a speed of vehicles in a lane of the vehicle below a threshold speed, a condition satisfied by a speed of vehicles in an adjacent lane to a lane of the vehicle below a threshold speed, and a condition satisfied by lateral biasing of vehicles in a lane of the vehicle.

15. The system of claim 11, wherein determining the rescue lane scenario associated with the environment comprises:

determining the vehicle is in a leftmost lane of a road or the vehicle is in a rightmost lane of the road; and determining vehicles in the leftmost lane of the road are laterally biased to a left of the leftmost lane or the vehicles in the rightmost lane of the road are laterally biased to a right of the rightmost lane.

16. A non-transitory computer-readable storage medium including instructions that, when executed, cause a computing system to perform operations comprising:

determining detection data associated with an environment;

determining map data associated with the environment, wherein the map data includes information associated with a presence of an emergency lane that is different from a rescue lane;

determining a rescue lane scenario associated with the environment based on the mpa data and satisfaction of rescue lane conditions associated with the rescue lane scenario by the detection data; and generating planning and control data for a vehicle based on the rescue lane scenario.

17. The non-transitory computer-readable storage medium of claim 16, wherein the detection data includes information associated with at least one of detected vehicles, detected construction signs, detected lane markings, detected road boundaries, distances between the vehicle and detected obstacles, speeds of detected obstacles, and directions of detected obstacles.

18. The non-transitory computer-readable storage medium of claim 16,
wherein the map data further includes information associated with at least one of a type of road and a number of lanes.

19. The non-transitory computer-readable storage medium of claim 16, wherein the rescue lane conditions include at least one of a condition satisfied by a road that includes at least two lanes in a direction of the vehicle, a condition satisfied by a road that lacks an emergency lane or a shoulder lane, a condition satisfied by a speed of vehicles in a lane of the vehicle below a threshold speed, a condition satisfied by a speed of vehicles in an adjacent lane to a lane of the vehicle below a threshold speed, and a condition satisfied by lateral biasing of vehicles in a lane of the vehicle.

20. The non-transitory computer-readable storage medium of claim 16, wherein determining the rescue lane scenario associated with the environment comprises:
determining the vehicle is in a leftmost lane of a road or the vehicle is in a rightmost lane of the road; and
determining vehicles in the leftmost lane of the road are laterally biased to a left of the leftmost lane or the vehicles in the rightmost lane of the road are laterally biased to a right of the rightmost lane.

\* \* \* \* \*